United States Patent
Ott et al.

(10) Patent No.: US 12,163,775 B2
(45) Date of Patent: Dec. 10, 2024

(54) METHOD OF DETECTING A DISTORTION OF A LIGHT PATTERN DEFINING A CODE WORD

(71) Applicant: VITRONIC Dr.—Ing. Stein Bildverarbeitungssysteme GmbH, Wiesbaden (DE)

(72) Inventors: Konstantin Ott, Wiesbaden (DE); Martin Zimprich, Wiesbaden (DE); Martin Richter, Frankfurt (DE)

(73) Assignee: VITRONIC DR.—ING. STEIN BILDVERARBEITUNGSSYSTEME GMBH, Wiesbaden (DE)

( * ) Notice: Subject to any disclaimer, the term of this patent is extended or adjusted under 35 U.S.C. 154(b) by 547 days.

(21) Appl. No.: 17/348,835

(22) Filed: Jun. 16, 2021

(65) Prior Publication Data

US 2021/0389123 A1    Dec. 16, 2021

(30) Foreign Application Priority Data

Jun. 16, 2020   (EP) .................................... 20180153

(51) Int. Cl.
  *G01B 11/25*   (2006.01)
(52) U.S. Cl.
  CPC .................. *G01B 11/25* (2013.01)
(58) Field of Classification Search
  CPC ...... G01B 11/04; G01B 11/25; G01B 11/2513
  USPC ......................................................... 356/610
  See application file for complete search history.

(56) References Cited

U.S. PATENT DOCUMENTS

| | | |
|---|---|---|
| 2011/0221891 A1 | 9/2011 | Sonoda |
| 2014/0118538 A1 | 5/2014 | Hoffmann et al. |
| 2014/0247326 A1 | 9/2014 | Hébert et al. |
| 2015/0304617 A1 | 10/2015 | Chang et al. |

(Continued)

FOREIGN PATENT DOCUMENTS

| | | | |
|---|---|---|---|
| CN | 103791842 A | 5/2014 | |
| CN | 108225176 A | 6/2018 | |
| DE | 4438759 C1 * | 11/1995 | ............ G01C 15/06 |

(Continued)

OTHER PUBLICATIONS

Extended European Search Report for European application No. 20180153.7, issued Dec. 1, 2020.

(Continued)

*Primary Examiner* — Sunghee Y Gray
(74) *Attorney, Agent, or Firm* — Burris Law, PLLC

(57) ABSTRACT

A method for detecting a distortion of a light pattern defining a code word includes projecting a light pattern onto an object via a light source and detecting the projected light pattern and comparing the detected light pattern with a reference light pattern. The reference light pattern has individual, spaced-apart light pattern elements arranged in a plurality of successive columns in the direction of a first extension axis and the number and/or position of the at least one light pattern element in each column of the reference light pattern is an encoding feature that defines at least one code word. The distortion of the detected light pattern with respect to the reference light pattern is determined by comparing distances between the light pattern elements of the detected light pattern with distances between the light pattern elements of the reference light pattern.

12 Claims, 4 Drawing Sheets

(56) References Cited

U.S. PATENT DOCUMENTS

Figure 1:
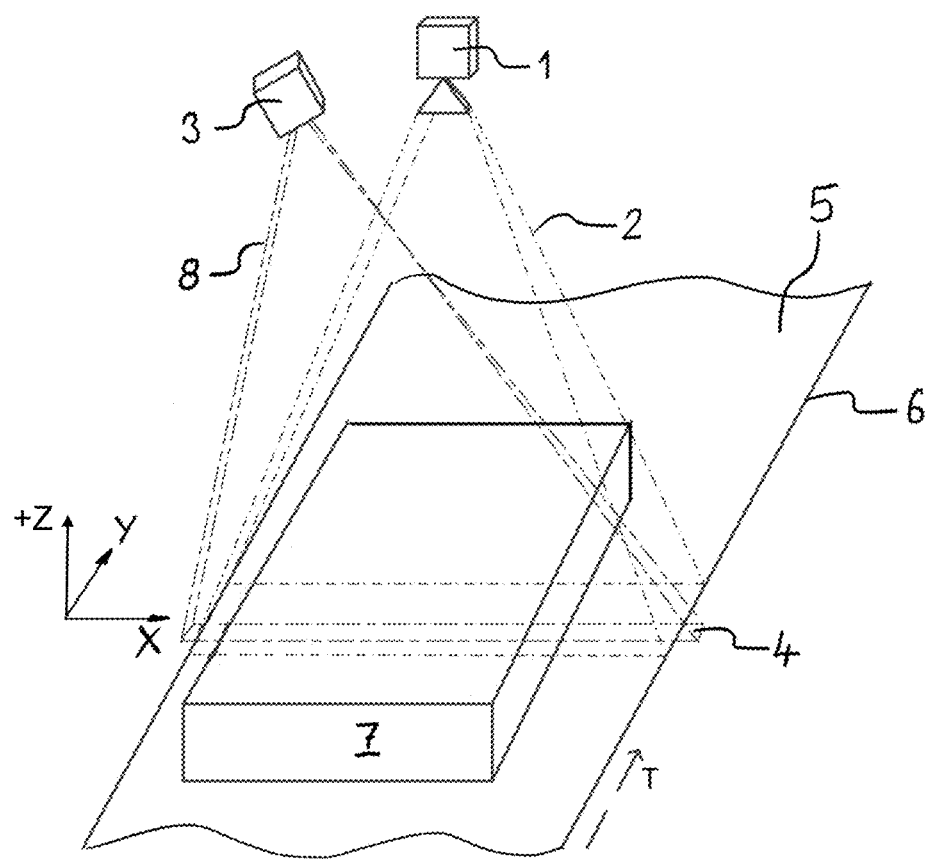

2018/0165824 A1   6/2018   Ackley et al.

FOREIGN PATENT DOCUMENTS

| EP | 2372648 | 10/2011 |
| EP | 2728305 | 5/2014 |
| WO | 2004083778 | 9/2004 |
| WO | 2013076605 | 5/2013 |

OTHER PUBLICATIONS

Examiner's Report issued in corresponding CA Application No. 3122486, issued Aug. 25, 2022, 6 pages.

Office Action issued in corresponding CN Application 202110652419.5, issued Oct. 11, 2023 and English Translation, 14 pages.

Office Action issued in corresponding EP Application No. 20180153.7, issued Jan. 17, 2022.

* cited by examiner

METHOD OF DETECTING A DISTORTION OF A LIGHT PATTERN DEFINING A CODE WORD

CROSS-REFERENCE TO RELATED APPLICATIONS

This application claims priority to and the benefit of EP 20180153.7 filed on Jun. 16, 2020. The disclosures of the above applications are incorporated herein by reference.

FIELD

The present disclosure relates to a method for detecting a distortion of a light pattern defining a code word.

BACKGROUND

The statements in this section merely provide background information related to the present disclosure and may not constitute prior art.

A light pattern is projected, for example, onto an object by a light source with the light pattern referenced to a reference plane representing a reference light pattern. The reference light pattern has individual, spaced-apart light pattern elements arranged in a plurality of successive columns in the direction of a first extension axis. The columns each extend in a direction of a second extension direction transverse to the first extension axis, and each include at least one of the light pattern elements. The number and/or position of the at least one light pattern element in each column of the reference light pattern is an encoding feature, wherein a sequence of light pattern elements in a predetermined number of consecutive columns define a code word. The light pattern is detected by an optical sensor (image sensor).

EP 2 728 305 A1 discloses a method that measures a height or a height profile of an object, wherein light pattern element groups from a sequence of a predetermined number of successive light pattern elements each define individual partial code words existing exactly once within the code word, wherein directly adjacent light pattern element groups partially comprise the same light pattern elements and wherein each light pattern element group is assigned to a specific reference position in the direction of the extension axis with respect to a reference plane. The height of the object is determined based on the detected position of the light pattern element groups in comparison to the respective reference position. In this case, the light pattern elements are individual light spots, the encoding feature being the position of the light spots in the direction transverse to the extension axis of the light pattern in the direction of the sequence of the individual light spots, the light spots being arranged in a plurality of rows along the extension axis of the light pattern.

Each light pattern element group is assigned to a specific reference position. When the method is used to determine the dimensions of packages on a conveyor belt, the reference position determines the position of the respective light pattern element group on the conveyor belt transverse to the transport direction. If a package is now transported through the light pattern, the light pattern element groups, which are reflected by the package surface, are shifted in the image captured by the optical sensor transversely to the transport direction, whereby the height of the package can be inferred from the extent of the shift, since the reference position is known. The conveyor belt forms a reference plane to which the spatial reference position refers.

If the object is conveyed on the conveyor belt with a tilted surface relative to the light source, the surface of the object can be tilted either to the side or to the front/back. At a roll angle, when the surface of the object is tilted to the side as viewed in the transport direction, the distances between the light pattern elements of the projected light pattern may change in the direction of the extension axis, so that the light pattern elements blur together in the worst case. At a pitch angle, when the surface of the object is tilted forward or backward as viewed in the transport direction, the projected light pattern can be sheared in the direction of the extension axis. There is a risk that the code word loses its uniqueness and can no longer be correctly decoded.

From WO 2004/083778 A1 a method and a light pattern for scanning a surface profile of an object are known.

WO 2013/076605 A1 discloses a method of projecting a slide image, wherein a distortion of the slide image caused by a projector is compensated. To do this, a set of distortion vectors of the projector is determined, where each distortion vector represents a distortion from predicted coordinates caused by that projector. To project a slide image without distortion, the corresponding distortion vectors are retrieved for each pixel coordinate of the slide image, and the distortion in the projected slide image is compensated by shifting the pixels of the slide image to be projected using this current distortion vector.

SUMMARY

This section provides a general summary of the disclosure and is not a comprehensive disclosure of its full scope or all of its features.

The present disclosure provides a method and a light pattern for detecting a distortion of a light pattern defining at least one code word.

Further, the invention relates to a light pattern for use in a method of detecting a distortion of a light pattern defining a code word, the light pattern comprising individual spaced-apart light pattern elements arranged in a plurality of successive columns in the direction of a first extension axis. The columns each extend in the direction of a second extension axis transverse to the first extension axis, and each include at least one of the light pattern elements. The number and/or position of the at least one light pattern element in each column of the light pattern is an encoding feature, defining a sequence of light pattern elements in a predetermined number of consecutive columns.

In one form of the present disclosure, a method for detecting a distortion of a light pattern defining a code word is provided. A light pattern is projected, for example, onto an object by a light source with the light pattern referenced to a reference plane representing a reference light pattern. The reference light pattern has individual, spaced-apart light pattern elements arranged in a plurality of successive columns in the direction of a first extension axis. The columns each extend in a direction of a second extension direction transverse to the first extension axis, and each include at least one of the light pattern elements. The number and/or position of the at least one light pattern element in each column of the reference light pattern is an encoding feature, wherein a sequence of light pattern elements in a predetermined number of consecutive columns define a code word. The light pattern is detected by an optical sensor (image sensor). At least a partial number of the light pattern elements of the reference light pattern define at least one predetermined geometric pattern, wherein the at least one geometric pattern is detected in the detected light pattern. A distortion of the detected light pattern with respect to the reference light pattern is determined by comparing the at least one geometric pattern of the detected light pattern with the at least one geometric pattern of the reference light pattern.

Further, the object is met by a light pattern for use in a method of detecting a distortion of a light pattern defining a code word, wherein the light pattern comprises individual light pattern elements arranged spaced apart from each other and arranged in a plurality of successive columns in the direction of a first extension axis. The columns each extend in the direction of a second extension axis transverse to the first extension axis, and each include at least one of the light pattern elements. The number and/or position of the at least one light pattern element in each column of the light pattern is an encoding feature, defining a sequence of light pattern elements in a predetermined number of consecutive columns. At least a partial number of the light pattern elements of a reference light pattern, with respect to a reference plane, define at least one predetermined geometric pattern, wherein a plurality of identical geometric patterns are arranged side by side in the direction of the first extension axis.

The method can be used, for example, in determining dimensions of objects, such as packages, in a package conveyor system. Here, the packages can be moved on a conveyor belt or on several conveyor rollers arranged one behind the other in one transport direction. In such a system, the conveyor belt or the conveyor rollers would define the reference plane. The first extension axis of the light pattern is arranged transverse to the transport direction. The reference light pattern is the light pattern projected onto the reference plane when the light pattern is projected, wherein the reference plane is arranged perpendicular to the viewing direction (sensor axis) of the optical sensor. In the case of a conveyor belt, this may be the plane of the conveyor belt onto which the light pattern is projected, provided the conveyor belt is perpendicular to the sensor axis.

The light pattern projected onto the conveyor belt, conveyor rollers, or other elements of the system, as well as onto the object, is detected by the optical sensor and recorded as an image of the detected light pattern so that it can be analyzed and further processed in a processing system, such as a computer. Similarly, the reference light pattern projected onto the reference plane can be captured as an image.

By detecting the geometric pattern in the captured light pattern, the shape and position of the light pattern, or that portion of the light pattern that defines the geometric pattern, can be determined. For example, the geometric patterns detected can be used to determine whether a distortion of the light pattern has occurred. Distortion can occur, for example, when the light pattern is incident on or projected onto a surface that is inclined with respect to the reference plane.

In some variations, an object (package) on a conveyor belt of a package conveyor system may have a tilted surface relative to the light source or the optical sensor or relative to the reference plane onto which the light pattern is projected. The tilted surface can be tilted to the side and/or to the front/rear in the transport direction. At a roll angle, i.e., when the surface is tilted to the side, and/or at a pitch angle, i.e., when the surface is tilted forward or backward, the distances between the individual light pattern elements in the detected light pattern relative to the reference light pattern may change, so that their order may change or they may merge or blur together. It can also happen that the individual light pattern elements in the detected light pattern distort. Both distortions of the light pattern can lead to the fact that the code word can no longer be decoded correctly.

For example, if the at least one geometric pattern is a triangle, the distances between the light pattern elements of the detected light pattern defining the geometric pattern may be compared to the distances in the reference light pattern to determine distortion.

According to at least one form of the method, when distortion is present or detected, an image of the detected light pattern may be rectified by converting the image of the detected light pattern such that the geometric pattern in the detected light pattern corresponds to the geometric pattern in the reference light pattern.

A rectification of the image of the detected light pattern may be performed by matching the distances between the light pattern elements defining the at least one geometric pattern in the detected light pattern to the distances in the reference light pattern as best as possible, wherein the correction (shear operation) applied to the light pattern elements of the geometric pattern is applied to all remaining light pattern elements.

In the image of the light pattern, the light pattern elements defining the at least one geometric pattern, in particular the supporting points or corner points of the geometric pattern, are detected. If certain light pattern elements defining the at least one geometric pattern are missing, for example if the light pattern elements have been heavily distorted, some light pattern elements may also be interpolated. In this case, the information of two light pattern elements as supporting points is sufficient to interpolate a third supporting point of the geometric pattern, if there are enough other light pattern elements from the light pattern lying around the geometric pattern provided.

Furthermore, the geometric patterns described herein can serve a neural network as fixed anchor points in the image processing, whereby the method described herein can alternatively be performed using a neural network.

Following the rectification, the captured light pattern can be decoded.

The at least one geometric pattern may be, for example, any polygonal line defined by at least three of the light pattern elements, such as a polygon, in particular a triangle.

At least a partial number of the light pattern elements can form supporting points of a geometric pattern, i.e. represent the corner points of the polygonal line. In the case of a triangle, for example, three light pattern elements may each be located on one of the corners of the triangle. Accordingly, the at least one geometric pattern is shaped in the form of a triangle, the corners of the triangle being defined by a respective one of the light pattern elements. However, the supporting points can also be arranged between two corners of the polygon course, for example to define a straight line.

A plurality of geometric patterns may be arranged sequentially in the direction of the first extension axis, wherein two geometric patterns arranged immediately adjacent to each other may have one or more common light pattern elements.

In one form of the method, a plurality of light patterns may also be arranged sequentially in the direction of the second extension axis. The multiple light patterns thus form a kind of light pattern array.

In one form of the method, this can be used to determine the dimensions of objects. In this regard, the light pattern (or respective light patterns when a light pattern array is formed) may comprise a plurality of sequences of a predetermined number of light pattern elements in successive columns each defining a code word, the light pattern elements of all successive columns collectively defining an overall code word.

The code words defined by the light pattern element groups can each exist individually exactly once within the overall code word. Thus, in the case of an incompletely detected or imaged light pattern, individual code words can be decoded whose position in the first extension axis is uniquely defined, since each code word exists only once within the overall code word. Each light pattern element group is thus assigned to a specific reference position in the direction of the first extension axis of the reference light pattern.

Immediately adjacent light pattern element groups may comprise partially the same light pattern elements. Accordingly, the code words overlap and are not arranged sequentially one after the other. A light pattern element group may, for example, consist of five light pattern elements arranged immediately adjacent to each other. For example, these light pattern elements may include the light pattern elements at the first through fifth positions of the light pattern. The immediately adjacent light pattern element group then includes, for example, the five light pattern elements at positions two through six. This means that in this example, to acquire a code word, only the number of light pattern elements defining a code word need ever be read, since any five light pattern elements can be read at any point in the light pattern to produce a code word.

The encoding feature of the light pattern elements can be different. For example, this may be the position of the light pattern element transverse to the first extension axis of the light pattern, in the case of a package volume determination this would be the position of the light pattern element in the transport direction. Accordingly, the light pattern elements can be aligned in different positions in the transport direction with respect to an axis transverse to the transport direction. The light pattern elements themselves may be spots, for example. However, the encoding feature may also be the length of the light pattern element in the direction transverse to the first extension axis of the light pattern and/or the number of light pattern elements within a column.

In some variations, the light pattern elements are spaced-apart light spots, i.e., they do not overlap and are all of the same size and shape.

Further areas of applicability will become apparent from the description provided herein. It should be understood that the description and specific examples are intended for purposes of illustration only and are not intended to limit the scope of the present disclosure.

DRAWINGS

Figure 2A:
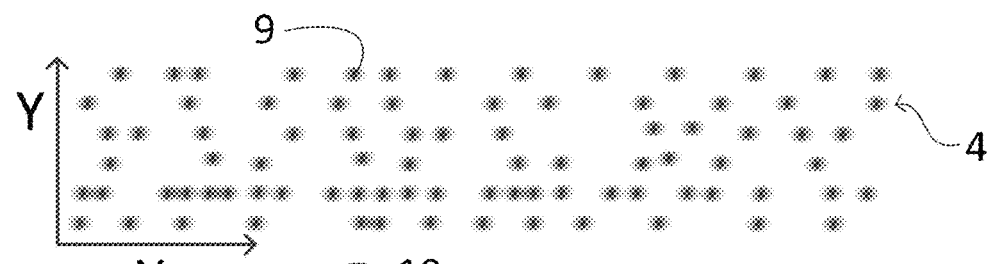
Figure 2B:
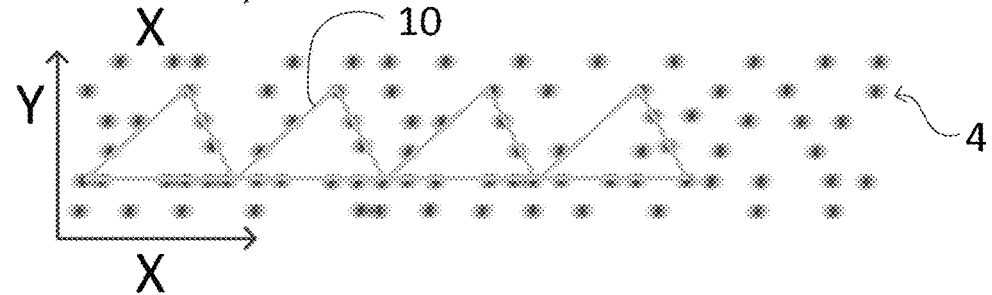
Figure 2C:
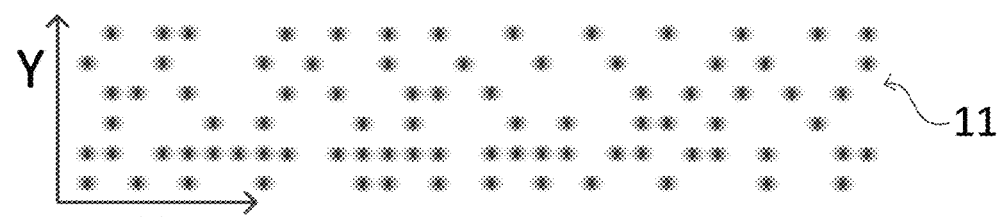
Figure 2D:
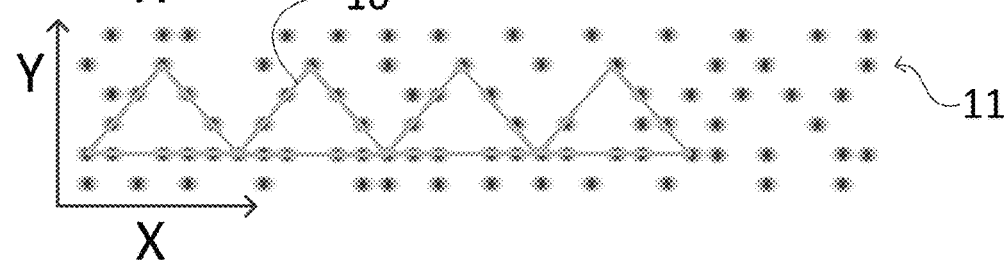
Figure 3:
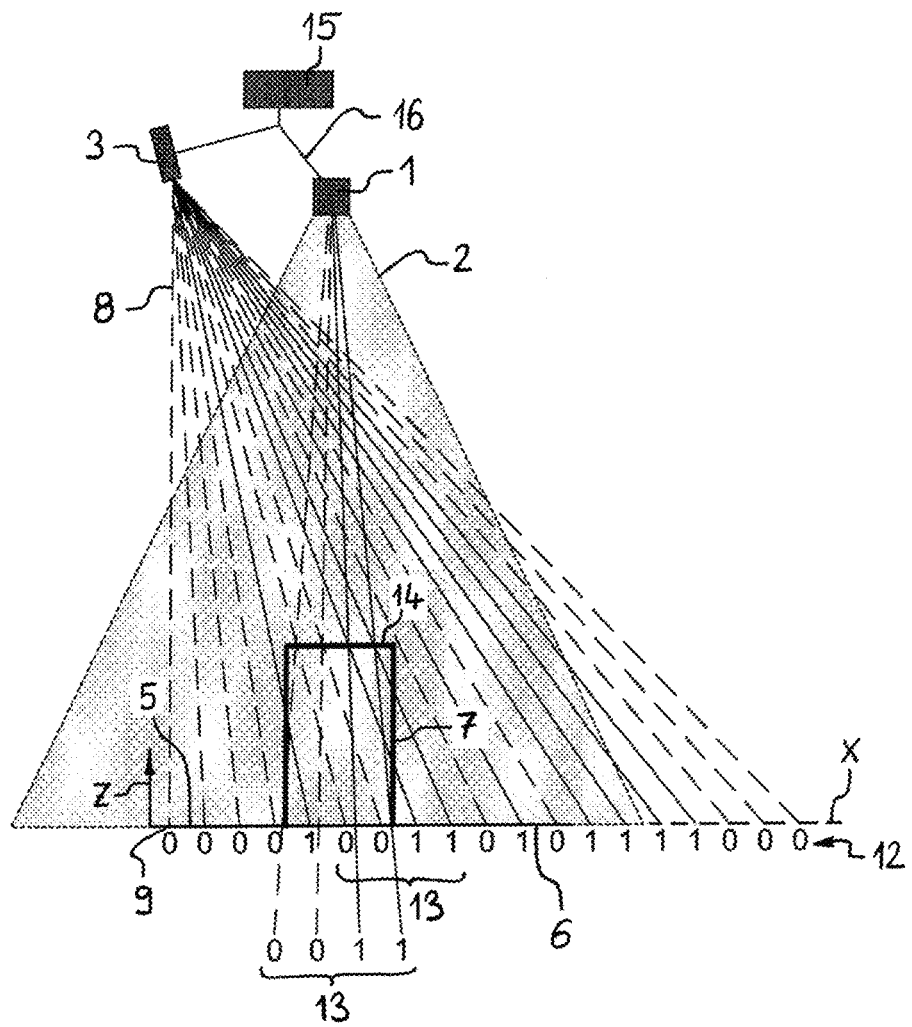
Figure 4:
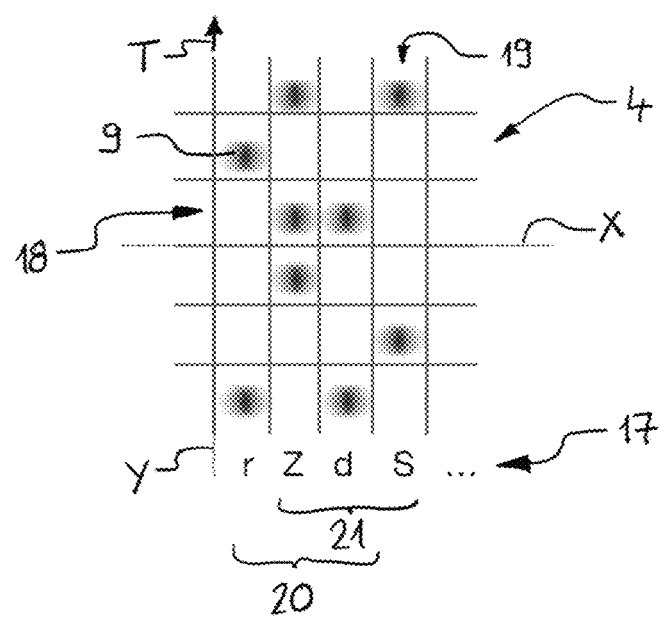

In order that the disclosure may be well understood, there will now be described various forms thereof, given by way of example, reference being made to the accompanying drawings, in which:

FIG. 1 is a perspective view of a device for carrying out a method of decoding an overall code word defined by a light pattern, FIG. 2a is an image of a distorted light pattern, FIG. 2b is an image of the distorted light pattern shown in FIG. 2a with the geometric pattern highlighted, FIG. 2c is an image of a reference light pattern, FIG. 2d is an image of the reference light pattern shown in FIG. 2c with the geometric pattern highlighted, FIG. 3 is a schematic representation of a further form of a device in the transport direction, and FIG. 4 a section of a light pattern.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows an example of a device for decoding an overall code word defined by a light pattern, in particular for measuring the height and elevation of an object.

The device comprises an optical sensor 1, e.g., in the form of an image sensor of a camera. The optical sensor 1 has a field of view 2, which can be seen in perspective in the present form with the dash-dotted lines indicating the field of view 2 of the optical sensor 1. Here it can be seen that the field of view 2 of the optical sensor 1 fans out in the direction of a first extension axis X, and to a lesser extent in a transport direction T transverse to the first extension axis X. The device further comprises a light source 3 in the form of a laser projecting a light pattern 4 towards a reference plane 5. In some variations, the reference plane 5 is defined by a surface (e.g., an upper surface) of a conveyor belt 6. The conveyor belt 6 is driven in the transport direction T. An object 7, e.g., in the form of a package lies on the conveyor belt 6, which is moved by the conveyor belt 6 in the transport direction T. In the present case, the object 7 is shown has a cuboid shape with a rectangular cross-section, however, it should be understood that objects with other shapes are included within the teachings of the present disclosure. In addition, and instead of a conveyor belt 6, other elements may be provided for conveying the object 7, such as driven conveyor rollers or conveyor drums. Alternatively, the optical sensor 1 and the light source 2 may be arranged dynamically and the objects 7 statically.

In some variations, the optical sensor 1 is arranged vertically above (+Z direction) the conveyor belt 6, approximately in the center of the conveyor belt 6 and the light source 3 is arranged laterally offset (X direction) to the optical sensor 1. In other variations, the light source 3 is arranged approximately centrally above the conveyor belt 6 and the optical sensor 1 is laterally offset to the light source 3.

The light source 3 projects the light pattern 4 onto the conveyor belt 6 and the object 7 in a projection area 8, wherein the light pattern 4 is formed in a striped shape in the direction of the first extension axis X. The projection area 8 is indicated by dashed lines. The object 7 is conveyed through the projection area 8 and through the field of view 2.

In the area where the object 7 is conveyed through the projection area 8, the projection area 8 and the field of view 2 are coplanar or overlapping with each other. This means that the optical sensor 1 can always detect the light pattern 4 projected onto the object 7 in the area where the object 7 is conveyed through the projection area 8. In this case, the field of view 2 is fanned out in the transport direction T in the same way or further than the projection area 8. Thus, in some variations the light pattern 4 is always in the field of view 2 of the optical sensor 1.

In some variations, the optical sensor 1 is a matrix camera and the light pattern 4 is narrower in the transport direction than the field of view 2, and a misalignment, i.e. an angular arrangement of the light pattern 4 relative to the field of view 2 of the optical sensor 1, can be compensated with a computer.

FIG. 2a shows an image of the light pattern 4 comprising individual light pattern elements in the form of light spots 9. A processing system or evaluation unit, generally a computer, determines whether there is a distortion of the light pattern 4 detected by the optical sensor 1. For this purpose, the individual positions of the light spots 9 are detected from the light pattern 4 on the basis of the image coordinates within the first extension axis X and a second extension axis Y that is generally parallel to the transport direction T. A partial number of light spots 9 serve as supporting points and each define a geometric pattern 10, as shown in FIG. 2b. In the present example, the geometric pattern 10 is a triangle. It can be seen that a plurality of identical geometric patterns 10 are arranged side by side in the direction of the first extension axis X.

The distortion is determined by extracting the point coordinates of the vertices of the geometric patterns 10 within the 2D image coordinates of the first extension axis X and the second extension axis Y, and determining the distances of the light spots 9 in the direction of the first extension axis X and the second extension axis Y. In the present case, the distances between three light spots 9 located on corner points of the triangular geometric pattern 10 are determined.

The ratios of the distances between the light spots 9 are matched to the known ratios of the distances between the light spots 9 of a reference light pattern 11. The reference light pattern 11 is shown in FIG. 2c, whereas in FIG. 2d the same reference light pattern 11 is shown and in addition, the undistorted geometric patterns 10 are visible. The reference light pattern 11 is that light pattern which results when the light pattern 4 is projected onto a reference plane 5 arranged perpendicular to the viewing direction or perpendicular to the sensor axis of the optical sensor 1, in the present case onto the surface of the conveyor belt 6.

If some of the light spots 9 are too distorted or if light spots 9 are missing at supporting points, the light spots 9 must have been detected at least two supporting points per geometric pattern 10 and further light spots 9 must be known in the direct vicinity of the geometric pattern 10 in order to be able to interpolate the missing light spots 9 or supporting points.

FIG. 3 shows another form of a device for measuring the height and elevation of an object. Components, which functionally correspond to components of the form or example according to FIG. 1, are provided with the same reference signs, even if the arrangement may differ from the arrangement according to FIG. 1.

It is also shown schematically that the projected light pattern 4 on the conveyor belt 6 is built up by light pattern elements in the form of light spots 9, the light spots 9 being binary coded in the example according to FIG. 3. Each light spot 9 thus results in a binary number 0 or 1. Together, all light spots 9 form an overall code word 12 across the width of the conveyor belt 6 or in the direction of the first extension axis X. In the present case, the overall code word 12 is represented by individual code words each having four light spots 9 forming a light pattern element group 13. As an example, a light pattern element group 13 is marked here, which defines the binary word (code word) "0011". The code word is uniquely and individually identifiable within the overall code word 12. The code word exists exactly once within the overall code word 12. The code word of the light pattern element group 13 is associated with an exact position along the first extension axis X, this being related to a reference plane represented by the surface of the conveyor belt 6. Thus, if the code word of the light pattern element group 13 is detected, it is clear where it is located on the reference plane.

If the package 7 is now moved through the projection area 8, individual light spots 9 of the light pattern 4 are reflected by the surface 14 of the object 7 (package) and picked up by the optical sensor 1. Since the light source 3 is arranged laterally offset from the optical sensor 1, in the image of the light pattern 4 picked up by the optical sensor 1, in the present case, the light pattern element group 13 shifts laterally to the right along the first extension axis X. Although the code word of the light pattern element group 13 is only partially arranged in vertical overlap with the package 7, the complete code word of the light pattern element group 13 is reflected from the surface 14 of the package 7. In the present case, a lateral displacement of about two of the light spots 9 takes place. Then, by a conventional triangulation method, the height of the surface 14 of the object 7 (package) can be calculated based on the magnitude of the displacement of the light pattern element group 13. For this purpose, a processing unit 15, for example in the form of a computer, is used, which is connected via data lines 16 to the optical sensor 1 and possibly also to the light source 3.

FIG. 4 shows a portion of another form of a light pattern 4 defining an overall code word 17. The light pattern 4 consists of individual light pattern elements in the form of light spots 9, which may be formed, for example, by a laser and a DOE (diffractive optical element). The individual light spots 9 are arranged side by side in the direction of the first extension axis X and thus transversely to the transport direction T, in six rows 18. The rows 18 are arranged one behind the other in the direction of the second extension axis Y, which is aligned parallel to the transport direction T in the shown form. In principle, it is also conceivable that the second extension axis Y extends transversely to the first extension axis X, but is not aligned exactly parallel to the transport direction T. Moreover, the light spots 9 are arranged in the direction of the first extension axis X in columns 19 arranged side by side, wherein in the shown form example a plurality of light spots 9 is positioned in each column 19. The position and the number of the respective light spots 9 in the direction of the second extension axis Y represent encoding features. However, it is also possible that exactly one light spot 9 is arranged in at least some of the columns 19, or even in all of the columns 19.

The light spots 9 of a column can each be assigned a character on the basis of the encoding features. This results in the overall code word 17 shown under the light pattern 4 in FIG. 4. For example, the overall code word 17 forms light pattern element groups with any three adjacent columns 19 of light spots 9. The code word of the leftmost first light pattern element group 20 has the coding "rZd". One column 19 to the right is a second light pattern element group 21 with the code word "ZdS".

Here, all said light pattern element groups 20, 21 overlap, thus partially comprising the same light spots 9. The first light pattern element group 20 thus has two columns 19 in common with the second light pattern element group 21. It is advantageous here that the light spots 9 of only three columns 19 need to be determined to identify a code word in order to be able to make an unambiguous assignment of this code word within the overall code word 17.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of detecting a distortion of a light pattern defining a code word, the method comprising the steps of:
    projecting a light pattern via a light source, wherein the light pattern referred to a reference plane represents a reference light pattern,
        wherein the reference light pattern comprises individual light pattern elements arranged at a distance from each other and arranged in a plurality of successive columns in a direction of a first extension axis,
        wherein the plurality of successive columns each extend in the direction of a second extension axis transverse to the first extension axis and each include at least one of the light pattern elements, and
        wherein at least one of a number and position of the at least one of the light pattern elements in each of the plurality of successive columns of the reference light pattern is an encoding feature and a sequence of light pattern elements in a predetermined number of the plurality of successive columns define a code word, and
    detecting the light pattern via an optical sensor,
        wherein at least a partial number of the light pattern elements of the reference light pattern define a plurality of predetermined geometric patterns arranged successively in the direction of the first extension axis, wherein the geometric patterns are detected in the detected light pattern, and
        wherein a distortion of the detected light pattern with respect to the reference light pattern is determined by comparing the geometric patterns of the detected light pattern with the geometric patterns of the reference light pattern.

2. The method according to claim 1, wherein, in order to determine the distortion, distances between the light pattern elements of the detected light pattern which define the geometric pattern are compared with the distances in the reference light pattern.

3. The method according to claim 2, wherein, in an event of the distortion, an image of the detected light pattern is rectified such that the distances between the light pattern elements defining the geometric patterns in the detected light pattern are at least approximately matched to the distances in the reference light pattern.

4. The method according to claim 1, wherein, in an event of the distortion, an image of the detected light pattern is rectified by converting the image of the detected light pattern such that the geometric patterns in the detected light pattern are at least approximated to the geometric patterns in the reference light pattern.

5. The method according to claim 4, wherein the code word is decoded in the rectified detected light pattern.

6. The method according to claim 1, wherein the geometric patterns are each defined by at least three of the light pattern elements.

7. The method according to claim 1, wherein the geometric patterns are triangles and corners of the triangles are each defined by one of the light pattern elements.

8. The method according to claim 1, wherein a plurality of light patterns are arranged successively in a direction of the second extension axis.

9. The method according to claim 1, wherein the light pattern comprises a plurality of sequences of a predetermined number of light pattern elements in successive columns defining a plurality of code words and the light pattern elements of all successive columns together defining an overall code word.

10. The method according to claim 9, wherein each of the plurality of code words exist individually exactly once within the overall code word defined by all the light pattern elements of the light pattern.

11. The method according to claim 10, wherein each of the plurality of code words is assigned to a specific reference position in a direction of the first extension axis of the reference light pattern within the light pattern.

12. The method according to claim 1, wherein the light pattern elements are light spots.

\* \* \* \* \*